United States Patent
Engel et al.

(10) Patent No.: US 7,036,700 B2
(45) Date of Patent: May 2, 2006

(54) MULTI-PURPOSE HOLDER INSTALLED IN A VEHICLE

(75) Inventors: Christopher G. Engel, Bloomfield Hills, MI (US); Jeff A. Kempf, Romeo, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/284,992

(22) Filed: Oct. 31, 2002

(65) Prior Publication Data
US 2004/0084592 A1 May 6, 2004

(51) Int. Cl.
*B60R 9/00* (2006.01)
(52) U.S. Cl. ............... 224/501; 224/510; 224/544; 224/926; 248/311.2
(58) Field of Classification Search ........... 224/485, 224/501, 510, 544, 926; 248/311.2
See application file for complete search history.

(56) References Cited

U.S. PATENT DOCUMENTS

| | | | |
|---|---|---|---|
| 4,887,784 A * | 12/1989 | Kayali | 248/311.2 |
| 5,014,956 A * | 5/1991 | Kayali | 248/311.2 |
| 5,029,720 A | 7/1991 | Bridges | |
| 5,040,719 A | 8/1991 | Ballway | |
| 5,040,761 A | 8/1991 | Yu-Tseng | |
| 5,285,953 A | 2/1994 | Smith | |
| D362,837 S | 10/1995 | Mankey et al. | |
| 5,490,653 A | 2/1996 | Ingwersen | |
| 5,511,755 A * | 4/1996 | Spykerman | 248/311.2 |
| 5,634,621 A * | 6/1997 | Jankovic | 248/311.2 |
| D388,050 S | 12/1997 | Diem | |
| 6,070,844 A | 6/2000 | Salenbauch et al. | |

FOREIGN PATENT DOCUMENTS

| | | |
|---|---|---|
| DE | 199 30 524 | 2/2000 |
| DE | 199 37 356 | 2/2001 |
| DE | 101 21 979 | 7/2002 |
| EP | 0 838 365 | 4/1998 |
| GB | 2 382 982 | 6/2003 |
| JP | 9-226436 | 9/1997 |
| JP | 10-29455 | 2/1998 |
| JP | 10-86734 | 4/1998 |
| JP | 2000-203348 | 7/2000 |
| JP | 2002-36933 | 2/2002 |

\* cited by examiner

*Primary Examiner*—Stephen K. Cronin
(74) *Attorney, Agent, or Firm*—MacMillan, Sobanski & Todd, LLC

(57) ABSTRACT

A multi-purpose holder for supporting an object in a vehicle includes a body structured and configured to receive an object. A support member is provided for supporting the object, and is vertically movably mounted relative to the body.

13 Claims, 3 Drawing Sheets

MULTI-PURPOSE HOLDER INSTALLED IN A VEHICLE

TECHNICAL FIELD

This invention relates to a holder for supporting an object. More particularly, the invention relates to a multi-purpose holder for supporting an object in a vehicle.

BACKGROUND OF THE INVENTION

Vehicle interiors typically include a variety of decorative and functional trim panels. For example, the front area of the interior of a vehicle, generally referred to as the cockpit area, includes an instrument panel, typically formed of a molded plastic material. Vehicles also may include a center console located between the driver and passenger seats for storage and placement of various articles. The instrument panel and/or center console can include a variety of devices for holding beverage containers, typically known as cup holders. There has also developed a desire on the part of vehicle occupants to stare other articles or objects in a vehicle such that the objects are within easy reach of the occupant. Known cup holders typically are adapted to hold known beverage containers, such as cans, cups, and bottles, and known objects, such as wireless telephones. Cup holders capable of holding objects or containers having a variety of sizes are known. However, such cup holders are often difficult to use, particularly with very large and very small containers. It would therefore be advantageous if there could be developed an improved multi-purpose holder for supporting objects and containers having different sizes and shapes in a vehicle.

SUMMARY OF THE INVENTION

This invention relates to a multi-purpose holder for supporting an object in a vehicle. The multi-purpose holder includes a body structured and configured to receive an object. A support member is provided for supporting the object, and is vertically movably mounted relative to the body.

Various objects and advantages of this invention will become apparent to those skilled in the art from the following detailed description of the preferred embodiment, when read in light of the accompanying drawings.

DETAILED DESCRIPTION OF THE INVENTION

Figure 1:
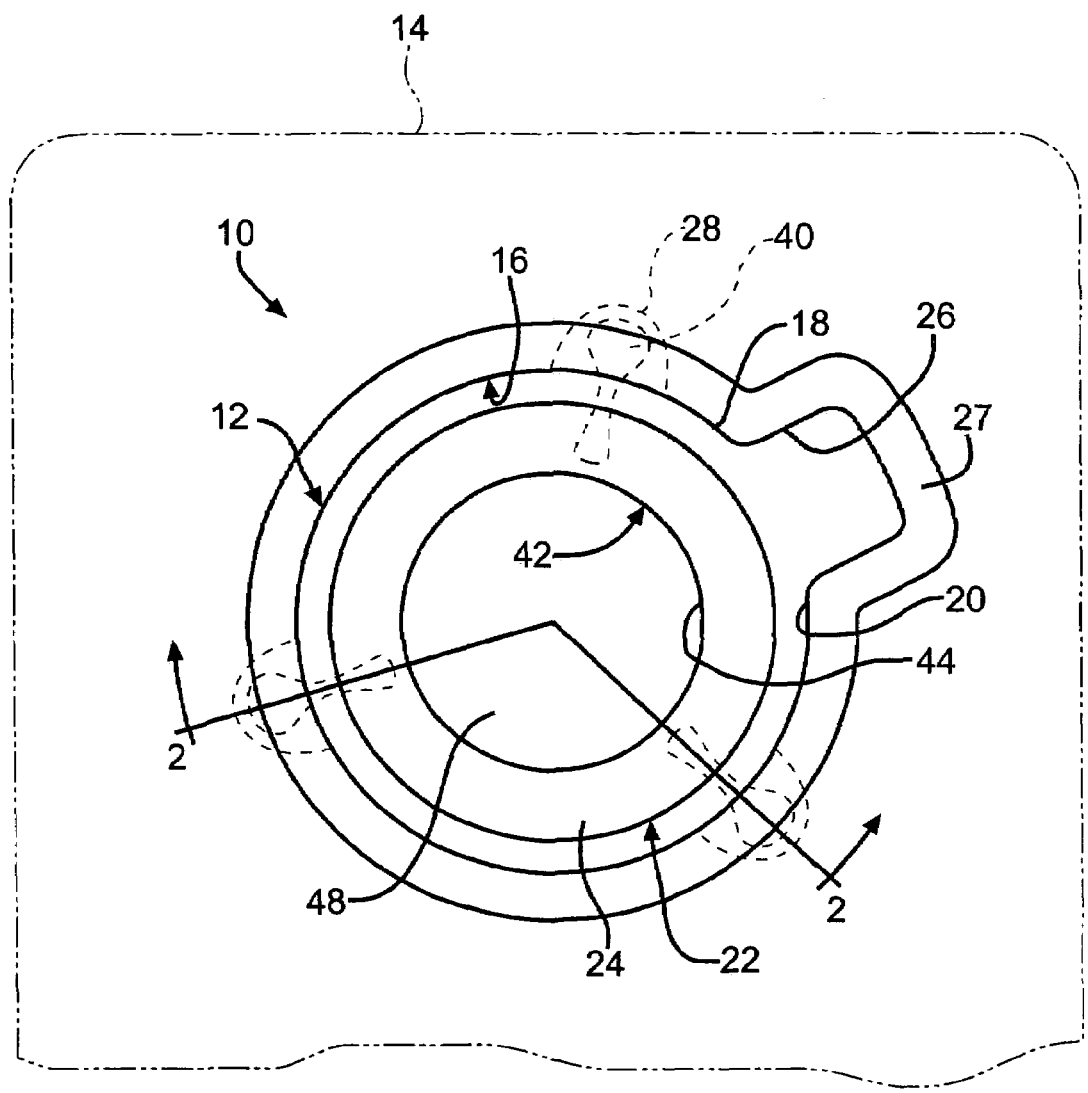
FIG. 1 is a top view of the multi-purpose holder according to the invention, showing the opening in the first support member.
Figure 2:
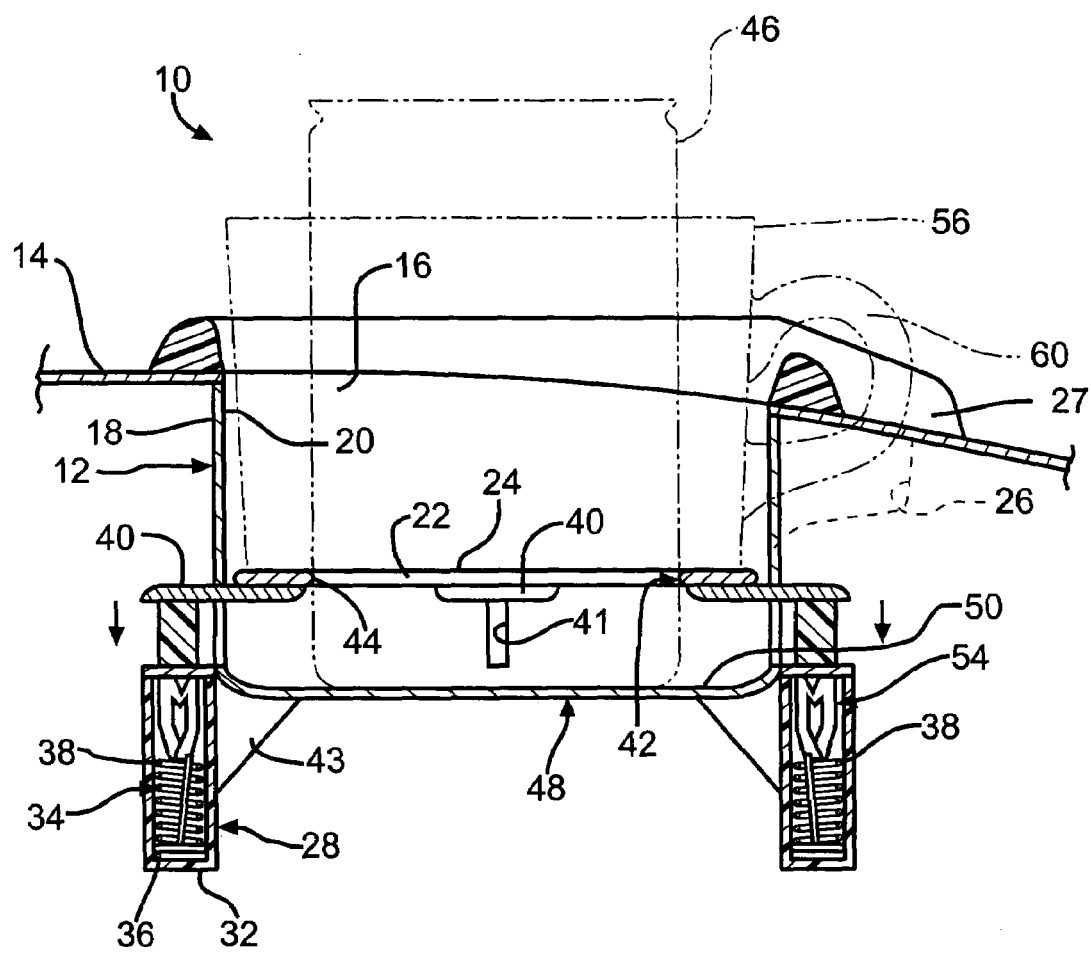
FIG. 2 is a cross sectional elevational view of a multi-purpose holder illustrated in FIG. 1, showing the holder in the raised position.
Figure 3:
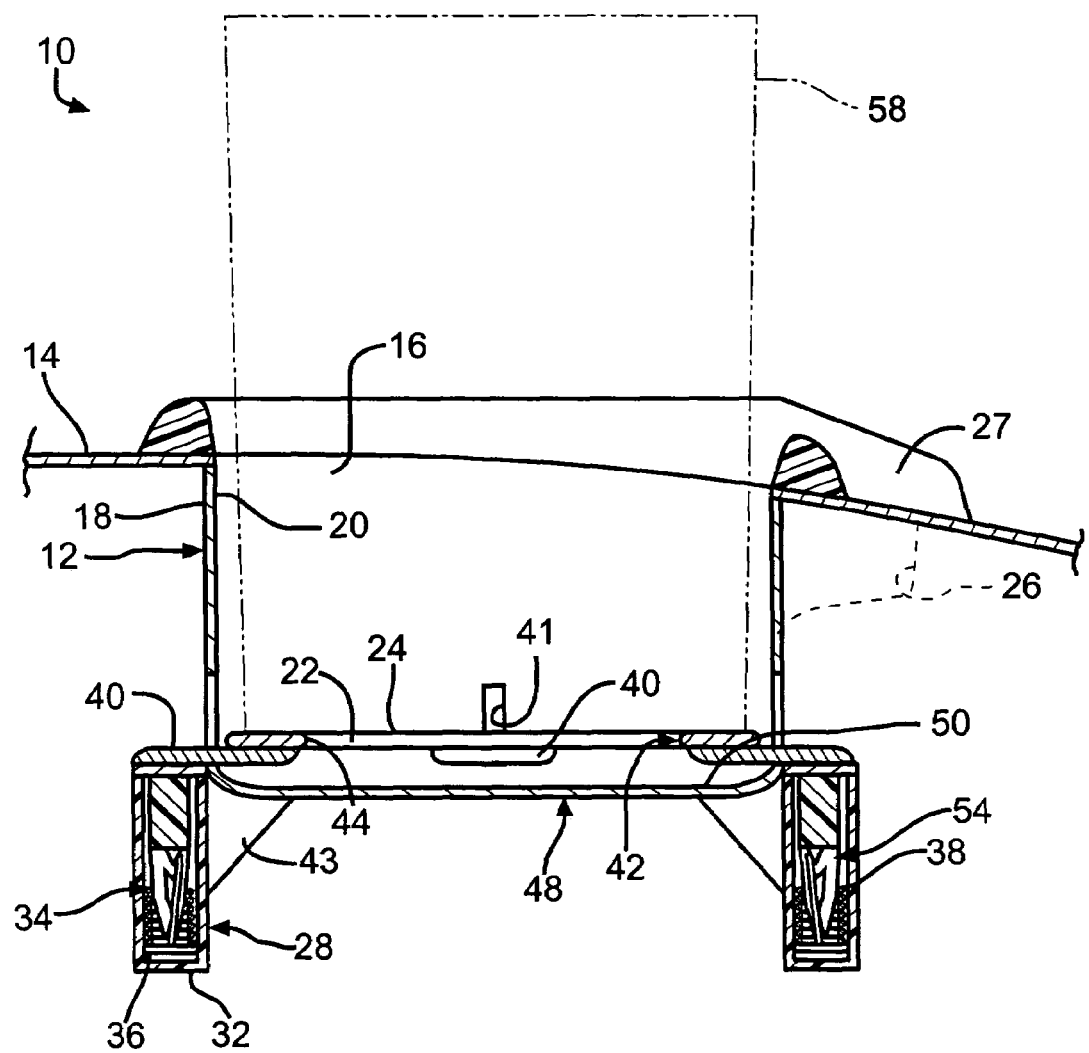
FIG. 3 is a cross sectional elevational view of the multi-purpose holder illustrated in FIG. 2, showing the holder in the lowered position.

As shown in FIGS. 1 through 3, a multi-purpose holder for supporting a beverage container or other object according to the invention is illustrated generally at 10. The holder 10 includes a body 12 adapted to be mounted within a vehicle, such as an automobile, a boat, or an airplane. The body 12 can be of any desired type structured and configured to receive an object, and can be located at any desired position in the vehicle. Preferably, the body 12 is mounted within an opening in a portion of the vehicle, such as a trim panel, an instrument panel, or a console 14. The body 12 may be attached to the vehicle by any desired means, such as threaded fasteners or with adhesive.

Preferably, the body 12 is generally cylindrical. More preferably, the body 12 defines a generally cup-shaped recess 16, and includes a side wall 18. An inner surface of the side wall 18 defines a first contact surface 20. A first support member 22 for supporting an object is disposed within the body 12. Preferably, the first support member 22 is vertically movably mounted relative to the body 12. The first support member 22 defines a substantially horizontal, upwardly facing, first support surface 24. A handle cavity 26, the purpose of which will explained herein, is preferably formed in a portion of the side wall 18, although a handle cavity 26 is not required. The side wall 18 can be formed without a handle cavity 26, or with a plurality of handle cavities 26.

The holder 10 can also include a decorative outer ring 27 disposed about the recess 16, and attached to the console 14 by any desired method, such as with threaded fasteners, adhesive, or with a snap-fit. The body 12 can be formed from any desired substantially rigid material, such as plastic. Polystyrene is a preferred material for the body 12 because of its strength and rigidity.

A plurality of spring housings 28 are disposed about a lower portion of the body 12. Preferably, the spring housings 28 extend radially outwardly and downwardly (as viewed in FIGS. 2 and 3) from the lower portion of the body 12. The first support member 22 is preferably biased toward a first or raised position, as shown in FIG. 2, by a coil compression spring 34 disposed within the spring housing 28. The first support member 22 can also be biased toward the raised position by any desired biasing means, such as an elastomeric member (not shown). A first end 36 of the spring 34 is preferably attached to a lower portion 32 of the spring housing 28. A second end 38 of each spring 34 is preferably attached to a latch 54, as will be described in detail herein. The arms 40 extend radially inwardly from the spring housings 28, through slots 41, and toward the recess 16. Strengthening ribs 43 can be provided between the body 12 and the spring housings 28.

Preferably, as shown in FIGS. 2 and 3, the first support member 22 is attached to the arms 40. The first support member 22 can be attached to the arms 40 by any desired method, such as, for example, with an adhesive, or threaded fasteners. It will be understood, however, that the first support member 22 can also be releasably attached to the arms 40, such that the first support member 22 can be removed to provide access to the lower portion of the body 12.

The first support member 22 is preferably substantially circular, however such is not required. The first support member 22 can also have any desired shape. Preferably, the first support member 22 has a shape that corresponds to the shape of the inner surface of the side wall 18. Preferably, the first support member 22 is formed of steel because of its strength and rigidity, however such is not required. The first support member 22 can also be formed from any other desired substantially rigid material, such as plastic or aluminum.

The first support member 22 preferably includes an opening 42 defining a second contact surface 44. The opening 42 is preferably circular so as to support a beverage container, such as a beverage cup, or a beverage can 46. However, the opening 42 of the first support member 22 can have any desired shape.

As shown in FIGS. 2 and 3, a second support member 48 defines an upwardly facing second support surface 50. The second support member 48 is preferably vertically spaced from the first support member 22. More preferably, the second support member 48 is positioned vertically below the first support member 22. The second support member 48 can be attached to the body 12 by any desired method. Preferably, the second support member 48 is integrally formed with the side wall 18 of the body 12.

Preferably, the first support member 22 is movable between the first or raised position, as shown in FIG. 2, a second or lowered position, as shown in FIG. 3, and a plurality of intermediate positions intermediate the first position and the second position.

In the first position, as shown in FIG. 2, the first support member 22 is preferably vertically above the second support member 48. The springs 34 urge the first support member 22 away from the second support member 48 and toward the raised position (upwardly as viewed in FIG. 2), such that the first and second support members 22 and 48, respectively, are spaced vertically apart relative to one another.

In the second position, a force, preferably applied by a vehicle occupant, urges the first support member against the force of the springs 34 (downwardly as viewed in FIG. 3). Additionally, in the second position, the first support member 22 is spaced relatively closer to the second support member 48 than in the first position.

More preferably, the latch 54 releasably latches the first support member 22 to the body 12, such that the first support member 22 is releasably retained in the second position.

Preferably, the latch 54 for latching the first support member 22 comprises a spring biased push-open or push-push mechanism, although a push-push mechanism is not required. In such a push-push mechanism, the first support member 22 can be locked by lightly pressing the first support member 22 downwardly when the first support member 22 is moved to the second position. The first support member 22 can also be unlocked, or moved from the second position to the first position, by lightly pressing the first support member 22 further downwardly into the body 12 and toward the second support member 48. Such a push-open mechanism 54 is familiar to one skilled in the art, and will not be described in greater detail herein.

It will be appreciated that the first support member 22 can be moved to any one of a plurality of intermediate positions (not shown). As used herein, such an intermediate position is defined as any position of the first support member 22 intermediate the first position and the second position. Such an intermediate position can be achieved when a force large enough to urge the springs 34 downwardly, but less than the force required to lock the first support member 22 in the second position, is applied to the first support member 22. Such a force can be applied by, for example, the mass of an object, such as a beverage container, placed upon the first support member 22.

An important aspect of the invention is the ability of the multi-purpose holder 10 to support a variety of sizes of objects, such as the beverage can 46, and a mug 56 as shown in FIG. 2, or a large beverage cup 58, as shown in FIG. 3.

When the first support member 22 is in the first position, as best shown in FIG. 2, the first support surface 24 can vertically support a lower portion of an object, such as the mug 56, which is also laterally supported by the first contact surface 20 of the body 12. Preferably, the springs 34 have sufficient spring force to urge the first support surface upwardly, as viewed in FIG. 2, such that the first support member 22 remains in the first position until an additional force is applied, such as by a vehicle occupant, to move the first support surface 24 to the second position. When the object includes a handle, such as a handle 60 of the mug 56, the handle 60 is preferably disposed within the handle cavity 26 of the side wall 18.

Further, when the first support member 22 is in the first position, as best shown in FIG. 2, an object such as the beverage can 46, can be disposed within the opening 42 of the first support member 22, such that the can 46 is laterally supported by the second contact surface 44 of the opening 42. A lower portion of the can 46 is also vertically supported by the second support surface 50.

When the first support member 22 is in the second position, as best shown in FIG. 3, the first support surface 24 can vertically support a lower portion of an object, such as the large beverage cup 58, which is also laterally supported by the first contact surface 20 of the body 12.

The principle and mode of operation of this invention have been described in its preferred embodiments. However, it should be noted that this invention may be practiced otherwise than as specifically illustrated and described without departing from its scope.

What is claimed is:

1. A multi-purpose holder for supporting an object in a vehicle comprising:
   a body defining a recess having a bottom support surface for vertically supporting an object; and
   a support member for supporting an object, said support member being vertically movably mounted within said recess of said body, wherein said support member includes an opening formed therein, thereby permitting an object having a width less than the width of the opening to be inserted through said opening and being supported by said support surface of said body;
   wherein said support member is vertically movable between a first position, a second position, and a plurality of intermediate positions intermediate said first position and said second position, said first position being vertically above said second position, said support member being biased toward said first position and supporting the object in any of said first, second, and plurality of intermediate positions.

2. The multi-purpose holder according to claim 1, wherein said support member is ring shaped.

3. The multi-purpose holder according to claim 1, wherein said body defines a first contact surface for laterally supporting the object.

4. The multi-purpose holder according to claim 1, wherein said support member defines a substantially horizontal first support surface for vertically supporting a lower portion of an object laterally supported by a first contact surface defined by said body.

5. The multi-purpose holder according to claim 1, wherein said support member is biased by a spring.

6. The multi-purpose holder according to claim 1, wherein in said second position, said support member defines a substantially horizontal second support surface for vertically supporting a lower portion of an object laterally supported by a first contact surface defined by said body.

7. The multi-purpose holder according to claim 1, further including a latch for releasably latching said support member in said second position.

8. The multi-purpose holder according to claim 7, wherein said latch comprises a push-push mechanism.

9. The multi-purpose holder according to claim 1, wherein said bottom support surface of said body is vertically below said support member.

10. The multi-purpose holder according to claim 9, wherein said opening in said support member includes a second contact surface for laterally supporting an object vertically supported by said bottom support surface of said body.

11. The multi-purpose holder according to claim 10, wherein said bottom support surface is substantially horizontal.

12. A multi-purpose holder for supporting an object in a vehicle comprising:
    a body defining a recess having a bottom support surface for vertically supporting an object;
    a support member for supporting an object, said support member being vertically movably mounted within said recess of said body, wherein said support member includes an opening formed therein, thereby permitting an object having a width less than the width of the opening to be inserted through said opening and being supported by said support surface of said body, wherein said support member is vertically movable between a first position, a second position, and a plurality of intermediate positions intermediate said first position and said second position, said first position being vertically above said second position, said support member being biased toward said first position; and
    a latch for releasably latching said support member in said second position.

13. The multi-purpose holder according to claim 12, wherein said latch comprises a push-push mechanism.

\* \* \* \* \*